Dec. 30, 1952   J. H. GODFREY ET AL   2,623,283
CUTTING TOOL
Filed Oct. 26, 1948   2 SHEETS—SHEET 2
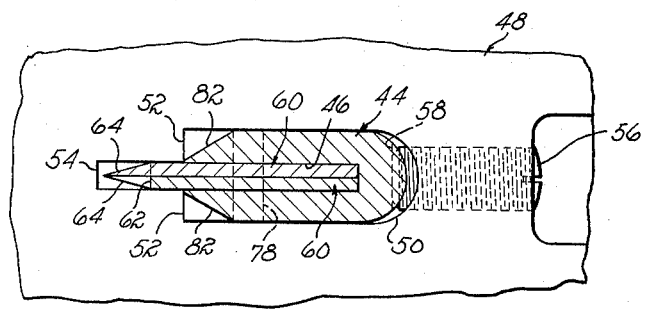
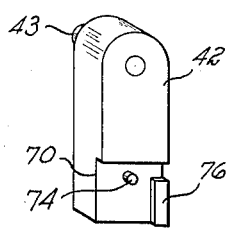
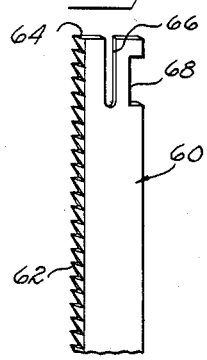
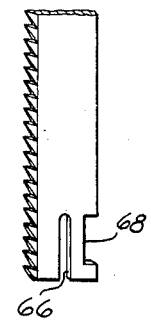
Inventors
JAMES H. GODFREY
HAROLD C. PECK
By Lindsey, Prutzman & Just
Attorneys Patented Dec. 30, 1952

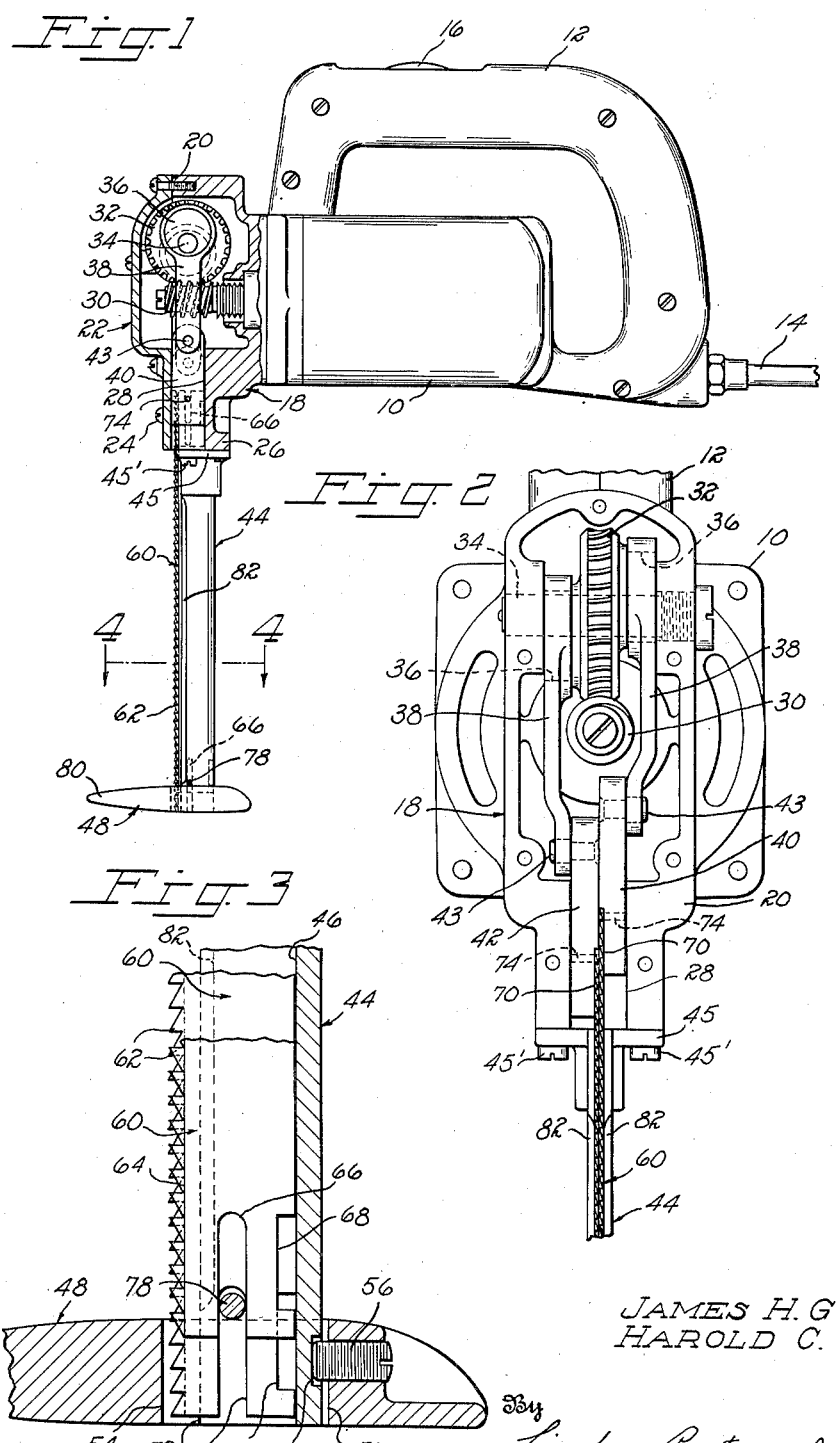

2,623,283

UNITED STATES PATENT OFFICE 2,623,283

CUTTING TOOL

James H. Godfrey, Berlin, and Harold C. Peck, New Britain, Conn., assignors to The Stanley Works, New Britain, Conn., a corporation of Connecticut Application October 26, 1948, Serial No. 56,652

1 Claim. (Cl. 30—216)

This invention relates to a cutting tool primarily designed for cutting or trimming elastic, yieldable and cellular material of the general nature and characteristics of so-called foam rubber or foam latex.

Due to the readily yieldable and elastic nature of material of this type, it has heretofore been difficult to cut or trim blocks or sheets of such material with saws or knives generally available for such or other purposes. Knives having unserrated edges have not been satisfactory even though the edges were very sharp and move at a relatively high rate of speed and regardless of whether said knives have been used singly or a pair of them used while moving in opposite directions.

Further, attempts have been made to enhance the unsatisfactory cutting action of implements now available by endeavoring to hold the material clamped, but this has not been found helpful inasmuch as the lack of rigidity inherent in the material is such that the same does not lend itself to being satisfactorily clamped or held while being cut.

It is an object of this invention to provide a cutting tool, suitable for use on this class of material, wherein a pair of blades are each provided with teeth along one edge and the blades are moved in opposite directions, whereby as the teeth of one blade are moved downward the teeth of the other blade are moved upward and such movements impart corresponding but counteracting motions in the material where it is being cut to thus maintain the material in a relatively stationary position during such cutting operations and no clamping of the material is necessary.

Other aims and objects of the invention are: to provide blades and teeth thereon of such shape that a minimum of cut particles are produced, to provide blades which are flat so as to permit inexpensive manufacturing thereof by stamping and grinding operations, to have the two blades of the same shape whereby they are interchangeable, to provide simplified positioning and guide means in the device so as to minimize the time and operations required to change or replace the blades, and to construct the guard and guide within which the blades operate in such a manner as to cooperate with the blades so as to place under tension uncut material immediately in front of the cutting teeth and thus facilitate the cutting action of the blades.

Details of these objects and aims as well as the structure comprising the invention and other objects thereof are set forth in the following specification and illustrated in the accompanying drawing forming a part thereof.

In the drawing, Fig. 1 is a vertical side elevation of a cutting device embodying the principles of the present invention, part of the device being shown in section to better illustrate details thereof.

Fig. 2 is a fragmentary front elevation showing the driving mechanism of the device when the front cover plate is removed.

Fig. 3 is a fragmentary sectional side elevation of the lower portion of the device shown in Fig. 1.

Fig. 4 is a sectional plan view, taken on the line 4—4 of Fig. 1, and illustrated in a scale larger than that shown in Figure 1.

Fig. 5 is a perspective view of one of the crossheads shown in Figs. 1 and 2.

Fig. 6 is a perspective view of one of the blades used in the device.

Referring to the drawings, and particularly Fig. 1, a housing 10 encloses an electric motor of a conventional type, details of which are not believed necessary in the present description. A handle 12 is connected to the housing 10, said handle having connected thereto a power cord or conduit 14 by which current is supplied to the motor within the housing 10. The handle also preferably includes a switch 16 by means of which flow of current to the motor is controlled.

Secured to the forward end of the housing 10 is a driving head 18 within which hereinafter described driving mechanism is enclosed. Head 18 is provided with a substantially flat front face 20 to which front cover 22 is secured by any suitable means such as a plurality of screws 24. The lower portion 26 of the head 18 is provided with a vertical guideway 28 which is U-shaped in cross section, said guideway being closed by the lower portion of the cover 22. Said guideway is preferably substantially rectangular in cross section and is for purposes to be described.

Projecting from the forward end of the motor referred to above is a worm 30 which drives a worm wheel 32 mounted on transverse shaft 34 which is supported at its opposite ends within suitable openings in the side walls of the upper portion of the head 18.

Fixed to opposite sides of the worm wheel 32 are a pair of eccentrics 36 which are disposed at 180° to each other. The eccentrics 36 individually drive connecting rods 38 which are clearly shown in Figs. 1 and 2. Said connecting rods are shaped so as to accommodate the worm therebetween as seen in Fig. 2.

Disposed within the guideway 28 is a pair of vertically disposed cross-heads 40 and 42. The upper ends of said cross-heads are connected to the connecting rods 38 by suitable pins 43 and, as will be obvious from the drawings, as the worm gear 32 is rotated by worm 30 the connecting rods will be actuated to reciprocate the cross-heads 40 and 42 in vertical but opposite parallel directions. The cross-heads 40 and 42 are shaped so as to closely but slidably fit within the rectangular guideway 28 and the lower portion of the cover 22, when connected to driving head 18, closely confines the cross-heads for slidable movement within said guideway 28.

Depending from and connected to the lower end surface of the lower portion 26 on head 18 is a member 44 provided with a vertically extending elongated guide channel 46. In cross section, as viewed particularly in Fig. 4, it will be seen that the guide channel 46 renders the member 44 U-shaped. Preferably the member 44 is provided at its upper end with a horizontally extending flange 45 which is detachably connected to said lower end surface of portion 26 by suitable screws 45'.

Secured to the lower end of the member 44 is a guide foot or shoe 48 having an opening 50 therein extending vertically therethrough for purpose of receiving the lower end of member 44. Said opening also includes a pair of shoulders 52 which engage the front edges of the side portions of the member 44 that define the guide channel 46. Said opening also includes an extension opening 54 extending forwardly for purposes to be described.

Shoe 48 is also provided with a threaded opening in its rearward portion to receive a set screw 56 which is arranged to be tightened against the rearward surface of the lower end of the member 44, as shown in Fig. 3, to tighten the shoulders 52 in the shoe 48 against the forward edges of the member 44. By this means the shoe 48 is firmly but detachably secured to the lower end of the member 44. If desired, the rearward portion of the lower end of the member 44 may be provided with a notch 58 to receive and properly position the set screw 56 and shoe 48 relative to member 44.

Mounted within guide channel 46 and also extending into the opening 50 and guideway 28 is a pair of blades 60 one of which is shown to advantage in Fig. 6. Said blades are flat elongated strip members which may be formed by cutting and stamping operation from strip stock. One edge of each blade is provided with a row of cutting teeth 62, all of which are placed so as to extend at an angle toward one end of the blade. The toothed edge of each blade is also beveled inwardly from one flat surface of the blade toward the other, whereby the teeth are pointed at their outer ends due to the beveled surface 64.

In operation, the blades are disposed with their flat, unbeveled surfaces in slidable engagement with each other and the teeth of each blade juxtapositioned.

No set is provided in the teeth and they may be readily sharpened by grinding the beveled surfaces 64. Further, in the preferred embodiment of the invention, the pitch of the teeth is relatively fine and of the order of that normally found in blades for coarse hack saws. However, this is not to be considered restrictive since the pitch of the teeth will largely depend upon the nature of the material to be cut. Extending inwardly from each end of each blade are longitudinally aligned slots 66 which are primarily for purposes of positioning and guiding the blades during the operation thereof. Extending inwardly from the rearward or non-toothed edge of each blade, adjacent each end thereof, is a notch-like opening 68 for purposes to be described.

The cross heads 40 and 42 are each provided adjacent their lower ends with a flat, shallow recess 70 which accommodates one of the upper ends of the two blades 60 when mounted within the device. The cross-heads are also both provided with positioning pins or projections 74. Each projection 74 is received within the slot 66 in the upper end of one of the blades received within said flat recess 70 in the cross-head for the purpose of properly positioning the blades relative to the cross-heads in a transverse direction.

Each cross-head is also provided with a lug 76 which is received within the opening 68 in the upper end of the blade connected to said cross-head, whereby said blade will move in opposite vertical directions as the cross-head is moved by its connecting rod 38. Inasmuch as the blades are maintained in slidable juxtaposition by the guide channel 46, and since the cross-heads 40 and 42 are likewise maintained in slidable juxtaposition within guideway 28, there is no possibility of the blades becoming detached from the cross-heads when the device is operating.

The slot 66 in the lower end of each blade receives a transverse guide means comprising a pin 78 which extends between suitable openings formed in the lower portion of the member 44. Pin 78 thus maintains the lower ends of the blades 60 in vertical longitudinal alignment and cooperates with the projections 74 on the cross-heads which serve to maintain the upper ends of the blades in similar alignment.

As will be seen from Figs. 1 and 3, and particularly the latter, when the two blades 60 are mounted in operative position the teeth 62 of one blade will be pointed upward, for example, and the teeth of the other blade will be pointed downward relative to the vertical direction of movement of said blades. Therefore, as the upward pointed teeth move upward into the material being cut, the downward pointed teeth on the other blade will move downward and counteract any upward movement imparted to the material by the teeth on the first mentioned blade. Such counteraction serves to maintain the material being cut in any position in which it reposes and no clamping or holding of the material is necessary while it is being cut.

It will be noted further that the forward end 80 of the guide shoe 48 is curved and tapered forwardly so that the shoe readily travels under the lower surface of the material being cut. Further, as mentioned hereinabove, the opening 50 in the shoe 48 has a forward extension 54 which accommodates the lower ends of the toothed edges of the blades 60, whereby the teeth on said blades do not contact the shoe 48 during operation of the blades.

Inasmuch as the blades 60 are identical, they may be interchanged with each other and only one style of blade need be maintained in stock for replacement purposes. Regardless of the side in the guide channel 46 within which a blade is disposed, the end slots 66 are both used for purposes of receiving either the projections 74 on one of the cross-heads 42 or the guide pin 78 projecting through the lower end of the guide channel 46. Only one of the notch-like openings 68 is used for purposes of receiving the lug 76 on one of the cross-heads and the other opening 68 is not used under these circumstances. However, the additional opening 68 is required when the blade is used in the other side of the guide channel from that disclosed above.

It will be apparent that when it is desired to shift a blade from its operative position within one side of the guide channel to the operative position of the blade in the other side of the channel, the blade is merely rotated 180° in a plane transverse to the plane of the blade when within the channel. Such rotation will place in the upper portion of the guide channel the opening 68 which was originally in the lower portion thereof. The opening 68 which is uppermost in the blade when mounted in the guide channel is the one which receives the lug 76 on one of the cross-heads.

Replacement or interchanging of the blades is readily accomplished merely by removing the guide shoe 48 from the lower end of the member 44, removing front cover 22 from the driving head 18, and sliding the cross-heads 40 and 42 forwardly out of the guideway 28 so that the upper ends of the blades may be disconnected from the projections 74 and lugs 76 on the cross-heads. The blades may then be shifted or replaced and the newly positioned blades as well as the cross-heads are then re-positioned within the guide channel 46 and guideway 28. The front cover 22 and the guide shoe 48 are then remounted in their operative positions.

Another advantageous feature of the invention comprises the provision of beveled surfaces 82 on the forward edges of the side portions of the member 44 which define the guide channel 46. As is clearly evident from Fig. 1 particularly, the beveled surfaces 82 extend from immediately above the upper surface of the guide shoe 28 to near the upper end of the member 44. Said beveled surfaces extend rearwardly and outwardly from the free edges of the side portions defining the guide channel 46 and the angle at which said beveled surfaces are disposed blend with the exposed forward toothed edges of the blades 60, as is readily shown in Fig. 4. The beveled surfaces 82 facilitate the cutting function of the teeth of the blades by camming apart the cut surfaces of the incision made in the material and thus place under tension the uncut material immediately in front of the teeth of the blades.

While the invention has been illustrated and described in its preferred embodiment and has included certain details, it should be understood that the invention is not to be limited to the precise details herein illustrated and described since the same may be carried out in other ways, falling within the scope of the invention as claimed.

What we claim is:

A device for cutting elastic yieldable material comprising in combination, a pair of blades having oppositely directed cutting teeth, the blades being arranged in a side-by-side relation with the inner confronting sides of the teeth substantially co-planar and the outer sides of the teeth tapered, guide means embracing the sides of the blades and tapering outwardly from said blades adjacent said teeth, and means for reciprocating said blades in opposite directions relative to said guide means.

JAMES H. GODFREY.
HAROLD C. PECK.

REFERENCES CITED

The following references are of record in the file of this patent:

UNITED STATES PATENTS

| Number | Name | Date |
|---|---|---|
| 139,426 | Scholfield | May 27, 1873 |
| 311,170 | Beurmann | Jan. 27, 1885 |
| 353,552 | Galster | Nov. 30, 1886 |
| 386,183 | Brooks | July 17, 1888 |
| 431,998 | Salisbury | July 8, 1890 |
| 460,677 | Christy | Oct. 6, 1891 |
| 703,036 | Baird | June 24, 1902 |
| 850,928 | Gury | Apr. 23, 1907 |
| 1,136,842 | Siegal | Apr. 20, 1915 |
| 1,254,563 | Anderson | Jan. 22, 1918 |
| 1,492,134 | Kyle | Apr. 29, 1924 |
| 1,690,808 | Appelbaum | Nov. 6, 1928 |
| 1,726,863 | Singer | Sept. 3, 1929 |
| 1,917,889 | Jacques | July 11, 1933 |
| 2,305,465 | Bangser | Dec. 15, 1942 |